United States Patent
Suemoto (10) Patent No.: US 7,598,986 B2
(45) Date of Patent: Oct. 6, 2009

(54) IMAGE PICK-UP APPARATUS AND WHITE BALANCE CONTROL METHOD

(75) Inventor: Kazunori Suemoto, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 1134 days.

(21) Appl. No.: 10/740,640

(22) Filed: Dec. 22, 2003

(65) Prior Publication Data

US 2004/0135899 A1 Jul. 15, 2004

(30) Foreign Application Priority Data

Jan. 10, 2003 (JP) ............................. 2003-004445
Jan. 10, 2003 (JP) ............................. 2003-004446

(51) Int. Cl.
*H04N 9/73* (2006.01)

(52) U.S. Cl. ............... 348/223.1; 348/222.1; 348/229.1

(58) Field of Classification Search ............... 348/223.1
See application file for complete search history.

(56) References Cited

U.S. PATENT DOCUMENTS

| | | | |
|---|---|---|---|
| 4,774,564 A * | 9/1988 | Konishi .................... 348/224.1 |
| 5,420,635 A | 5/1995 | Konishi et al. |
| 5,504,525 A | 4/1996 | Suzuki |
| 6,211,915 B1 * | 4/2001 | Harada ........................ 348/298 |
| 6,236,434 B1 | 5/2001 | Yamada |
| 6,747,694 B1 | 6/2004 | Nishikawa et al. |
| 6,924,841 B2 * | 8/2005 | Jones ......................... 348/294 |
| 2004/0051790 A1 * | 3/2004 | Tamaru et al. ........... 348/223.1 |
| 2004/0085475 A1 * | 5/2004 | Skow et al. .................. 348/362 |
| 2004/0130638 A1 * | 7/2004 | Sakamoto .................... 348/254 |
| 2005/0231606 A1 * | 10/2005 | Suzuki .................... 348/222.1 |

FOREIGN PATENT DOCUMENTS

| | | |
|---|---|---|
| JP | 5-64083 A | 3/1993 |
| JP | 5-111045 A | 3/1993 |
| JP | 6-165-189 A | 6/1994 |
| JP | 8-98188 A | 4/1996 |

(Continued)

OTHER PUBLICATIONS

Saito Y., Calibrating enzyme immunoassay system using standard samples having known concns., their intensities are detected by chemical luminescence generated in photomeric cell, 1996, Derwent Acc No. 1991-275494.*

*Primary Examiner*—Jason Chan
*Assistant Examiner*—Cynthia Calderon
(74) *Attorney, Agent, or Firm*—Birch, Stewart, Kolasch & Birch, LLP (57) ABSTRACT

In an image pick-up apparatus which has an image pick-up device having a main pixel of high sensitivity and a sub-pixel of low sensitivity in one pixel, gain values for white balance adjustment are calculated in association with each of the main pixel and the sub-pixel, or gain values for white balance adjustment are stored in advance for each of the main pixel and the sub-pixel. White balance adjustment is separately performed on the main pixel and the sub-pixel using the gain values for white balance adjustment, and image signals from both of them are synthesized to obtain one image. Thus, proper white balance control can be allowed to obtain an picked-up image having excellent color reproducibility.

9 Claims, 6 Drawing Sheets

FOREIGN PATENT DOCUMENTS

| | | |
|---|---|---|
| JP | 9-294273 A | 11/1997 |
| JP | 10-136391 A | 5/1998 |
| JP | 10-294949 A | 11/1998 |
| JP | 11-187412 A | 7/1999 |
| JP | 2000-299876 A | 10/2000 |
| JP | 2000-350220 A | 12/2000 |

* cited by examiner

PRIOR ART

IMAGE PICK-UP APPARATUS AND WHITE BALANCE CONTROL METHOD

This Nonprovisional application claims priority under 35 U.S.C. § 119(a) on Patent Application No(s). 2003-004445 and 2003-004446 filed in JAPAN on Jan. 10, 2003, the entire contents of which are hereby incorporated by reference.

BACKGROUND OF THE INVENTION

1. Field of the Invention

The present invention relates to an image pick-up apparatus and, more particularly, to white balance control of the image pick-up apparatus utilizing an image pick-up device having a plurality of pixels that are different in sensitivity.

2. Description of the Related Art

In an image pick-up apparatus such as a digital still camera, white balance control is performed to allow color reproduction with high fidelity to the object. In the case of common white balance control, gains for R and B color components among color information of three colors, i.e., R, G, and B of an image which has been acquired are adjusted on the basis of the G color component such that the levels of the colors become equal.

First white balance controlling functions provided in image pick-up apparatus include automatic white balancing that is an automatic white balance adjustment performed by the apparatus through determination of the scene being photographed according to a predetermined control procedure and, in addition, so-called custom white balancing that allows a user to perform a specific white balance adjustment for some purpose. For example, custom white balancing is carried out by performing a certain operation such as pressing a button while photographing an object such as white paper to control gains such that the levels of three colors, i.e., R, G, and B of the object image are made equal to achieve a white balance. The custom white balancing allows white balance control to be properly performed depending on photographic conditions such as a particular light source.

In an example of conventional white balance control, average values of color information of three colors, i.e., R, G, and B of an image which has been acquired are calculated; gains for the R and B color information relative to the G color information are calculated such that the calculated average values become equal; the calculated gains for the color information are compared with gains for the color information which has been calculated in advance; and, when comparison results indicate that they are substantially the same, white balance of the acquired image is changed based on the average values and the gains of color information thus calculated, thereby preventing inadequate changes of the color of the image (see JP-A-9-294273, for example).

Alternatively, a strobe is made to emit light by operating predetermined operating means; an image pick-up signal is acquired from an object at second timing after first timing at which the strobe emits light; and white balance adjustment is performed based on the image pick-up signal thus acquired. This allows white balance to be set in accordance with the color temperature of an actual light source even when a photograph is taken using a strobe (see JP-A-5-111045, for example).

Figure 6:
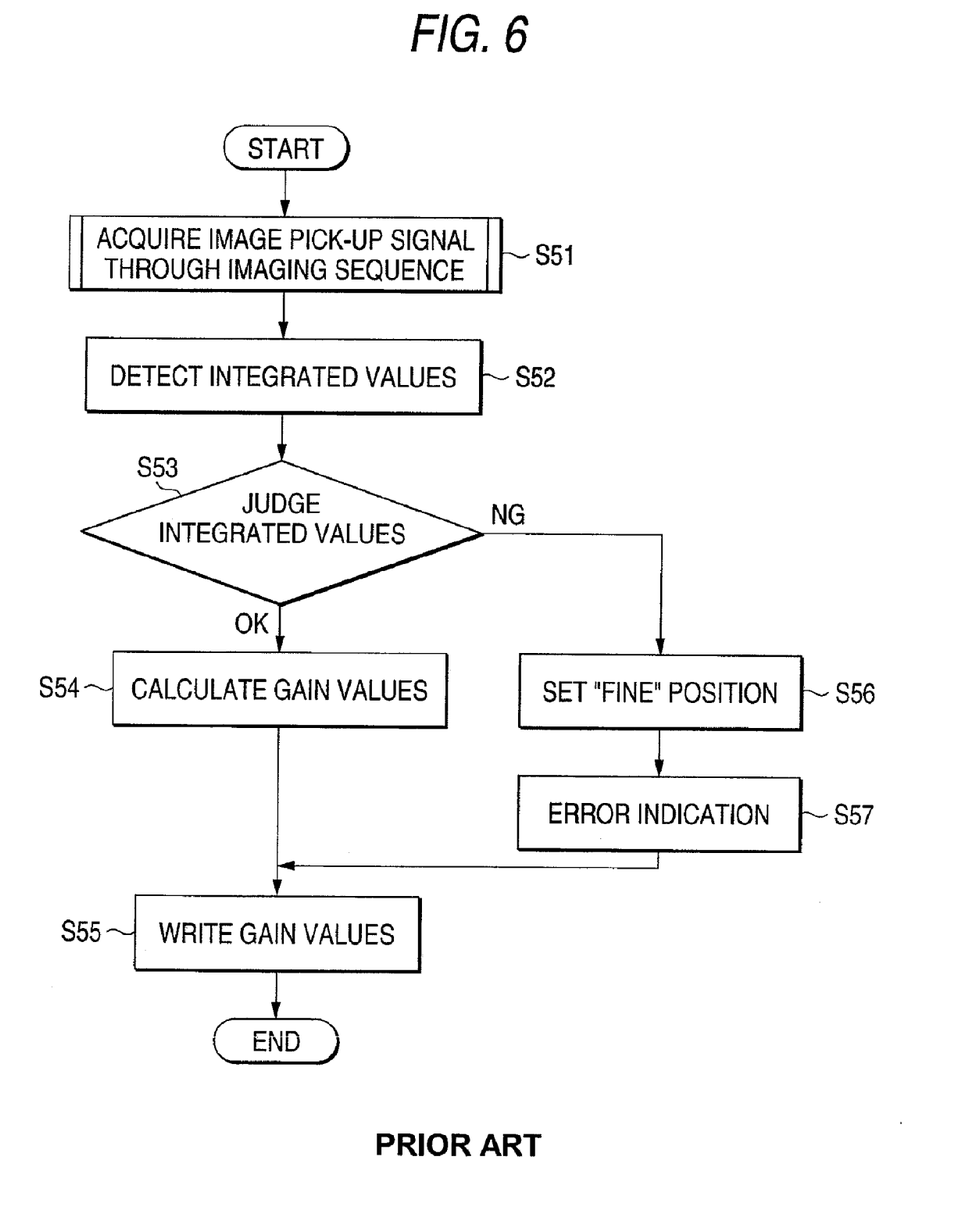
FIG. 6 is a flow chart showing an example of a gain setting process included in custom white balance control performed according to the prior art.

FIG. 6 is a flow chart showing an example of a gain setting process included in custom white balance control performed as described above. First, a button or the like is operated to instruct the commencement of custom white balance setting, and a photographing sequence is performed to acquire an image pick-up signal (step S51). Next, integrated values of three color components, i.e., R, G, and B of the acquired image pick-up signal are calculated (step S52), and it is judged whether the calculated values are in a specified range of signal levels (step S53). When the integrated values are in the predetermined range of levels, gain values for white balance adjustment are calculated such that the levels of the three color components, i.e., R, G, and B become equal (step S54), and the gain values for the colors thus calculated are written in a memory as gain values for custom white balancing (step S55). When the integrated values are out of the predetermined range of levels, white balance is set at "fine position" (step S56), and an error indication is given (step S57).

When a photograph is taken with such a setting of custom white balance, white balance adjustment is performed on an image pick-up signal acquired through a photographing sequence using the gain values for custom white balancing held in the memory.

Second white balance controlling functions provided in image pick-up apparatus include automatic white balancing that is an automatic white balance adjustment performed by the apparatus through determination of the scene being photographed according to a predetermined control procedure and, in addition, manual white balancing that is white balance adjustment performed by a user through manual selection of a white balance position depending on the scene being photographed or the light source.

In an example of conventional automatic white balancing, the scene being photographed and the light source at the time of photographing are determined from color information of the image signals photographed, and white balance adjustment is performed using a predetermined gain (see JP-A-6-165189 and JP-A-2000-299876, for example). In an example of conventional manual white balancing, the photographer selects a white balance position such as "fine", "cloudy", "electric bulb", or "fluorescent lamp" position that is set for each scene to be photographed or each light source, and white balance adjustment is performed using a gain associated with the white balance position thus selected (see JP-A-2000-299876 and JP-A-11-187412, for example).

JP-A-9-294273 (pp. 3-4 and FIG. 2), JP-A-5-111045 (pp. 3-5 and FIG. 1), JP-A-6-165189 (pp. 3-4 and FIG. 1), JP-A-2000-299876 (pp. 5-7 and FIG. 1) and JP-A-11-187412 (pp. 3-5 and FIG. 1) are known as related art.

For example, let us assume an image pick-up apparatus such as a digital still camera in which a solid-state image pick-up device has both of pixels having high sensitivity and pixels having low sensitivity and in which a high sensitivity image picked up by the high sensitivity pixels and a low sensitivity image picked up by the low sensitivity pixels are synthesized and output as data of one image to achieve a wide dynamic range. In such an image pick-up apparatus, the high sensitivity pixels and the low sensitivity pixels may have different spectral sensitivity characteristics, and the high sensitivity pixels and the low sensitivity pixels may be different from each other in the ratio between output signal levels of R, G, and B color components even when a photograph is taken under the same photographic conditions. As a result, color balance of an image signal obtained by synthesizing the output of the high sensitivity pixels and the output of the low sensitivity pixels can be lost when the above-described custom white balance control is performed.

SUMMARY OF THE INVENTION

The object of the invention is to provide an image pick-up apparatus utilizing an image pick-up device having a plurality of pixels that are different in sensitivity, in which white balance control can be properly performed to obtain picked-up image with good color reproducibility, and a white balance control method of the same.

The invention provides an image pick-up apparatus which includes an image pick-up device having a plurality of pixels that are different in sensitivity, having: white balance control value calculating means for calculating control values for white balance adjustment of each of said plurality of pixels based on image signals from said image pick-up device acquired by imaging an object, and white balance adjusting means for performing white balance adjustment of each of signals acquired from the plurality of pixels of said image pick-up device with using said control values.

According to the configuration, an image having excellent color balance can be obtained by performing white balance adjustment with a separate control value calculated for each of the plurality of pixels that are different in sensitivity.

Furthermore, said image pick-up device has main pixels having high sensitivity and sub-pixels having low sensitivity as said plurality of pixels.

According to the configuration, since white balance control can be optimized to improve color reproducibility when achieving a wide dynamic range using the image pick-up device having main pixels of high sensitivity and sub-pixels of low sensitivity, it is possible to obtain a photographic image having a wide dynamic range and excellent color reproducibility.

Furthermore, the image pick-up apparatus further has storage means for storing said control values for white balance adjustment, wherein said white balance control value calculating means calculates a first control value for white balance adjustment associated with said main pixel and a second control value for white balance adjustment associated with said sub-pixel to store the first control value and the second control value to said storage means.

According to the configuration, in performing so-called custom white balancing in which control values are set from an image obtained by photographing an object, a control value is calculated and stored for each of the main pixel and the sub-pixel to allow an proper white balance adjustment in each of the main pixel and the sub-pixel.

Furthermore, said white balance adjusting means performs white balance adjustment of an image signal from said main pixel and white balance adjustment of an image signal from said sub-pixel with using the first control value and the second control value stored in said storage means.

According to the configuration, white balance adjustment is separately performed for each of the main pixel and the sub-pixel using the first control value for the main pixel and the second control value for the sub-pixel, which allows proper white balance control to obtain a photographic image having excellent color reproducibility.

The invention provides a white balance control method by an image pick-up apparatus which includes an image pick-up device having a plurality of pixels that are different in sensitivity, having the steps of: calculating control values for white balance adjustment of each of said plurality of pixels based on image signals from said image pick-up device acquired by imaging an object, and performing white balance adjustment of each of image signals acquired from the plurality of pixels of said image pick-up device using said control values.

The above procedure makes it possible to obtain an image having excellent color reproducibility by separately performing white balance adjustment in each of a plurality of pixels that are different in sensitivity.

The invention provides an image pick-up apparatus which includes an image pick-up device having a plurality of pixels that are different in sensitivity, having: storage means for storing control values for white balance adjustment which are set in association with each of said plurality of pixels, and white balance adjusting means for performing white balance adjustment of each of image signals acquired from the plurality of pixels of said image pick-up device with using said control values.

According to the configuration, a photographic image having excellent color balance can be obtained by performing white balance adjustment using a different control value in each of the plurality of pixels that are different in sensitivity.

Furthermore, said image pick-up device has main pixels having high sensitivity and sub-pixels having low sensitivity as said plurality of pixels.

According to the configuration, since white balance control can be optimized to improve color reproducibility when achieving a wide dynamic range using the image pick-up device having main pixels of high sensitivity and sub-pixels of low sensitivity, it is possible to obtain an image having a wide dynamic range and excellent color reproducibility.

Furthermore, said storage means stores a first control value for white balance adjustment associated with said main pixel and a second control value for white balance adjustment associated with said sub-pixel, and said white balance adjusting means performs white balance adjustment of an image signal from said main pixels and white balance adjustment of an image signal from said sub-pixel with using the first control value and the second control value stored in said storage means.

According to the configuration, for example, when so-called manual white balancing using preset control values is performed, a proper white balance adjustment can be performed in each of the main pixel and the sub-pixel by using the first control value associated with the main pixel and the second control value associated with the sub-pixel.

Furthermore, said storage means stores a control value for white balance adjustment associated with said main pixel, and said white balance adjusting means performs white balance adjustment of an image signal from said main pixel with using said control value stored in said storage means and performs white balance adjustment of an image signal from said sub-pixel with using said control value and a color difference ratio of the image signals between said main pixel and said sub-pixel.

According to the configuration, for example, when so-called manual white balancing using preset control values is performed, a proper white balance adjustment can be performed in each of the main pixel and the sub-pixel by using the control value associated with the main pixel and the color difference ratio of the sub-pixel relative to the main pixel.

Furthermore, said white balance adjusting means performs white balance adjustment of the image signal from said main pixel with using a control value for white balance adjustment which are set in association with said main pixel.

According to the configuration, for example, a proper white balance adjustment can be performed to obtain an image having excellent color reproducibility by using the control value set in association with the main pixel for the image signal read from only the main pixel.

Furthermore, said white balance adjusting means performs white balance adjustment of an image signal from said sub-pixel with using a control value for white balance adjustment which are set in association with said sub-pixel.

According to the configuration, for example, a proper white balance adjustment can be performed to obtain a photographic image having excellent color reproducibility by using the control value set in association with the sub-pixel for the image signal read from only the sub pixel.

Furthermore, said storage means stores control values set for each of white balance positions which are associated with a plurality of imaging conditions, respectively.

According to the configuration, for example, when so-called manual white balancing using a control value preset for each of white balance positions associated with photographing conditions such as scenes to be photographed and light sources, a proper white balance adjustment can be performed in each of the main pixel and the sub-pixel using the control value set for each of the white balance positions.

DETAILED DESCRIPTION OF THE PREFERRED EMBODIMENTS

Embodiments of the invention will now be described with reference to the drawings.

First Embodiment

Figure 1:
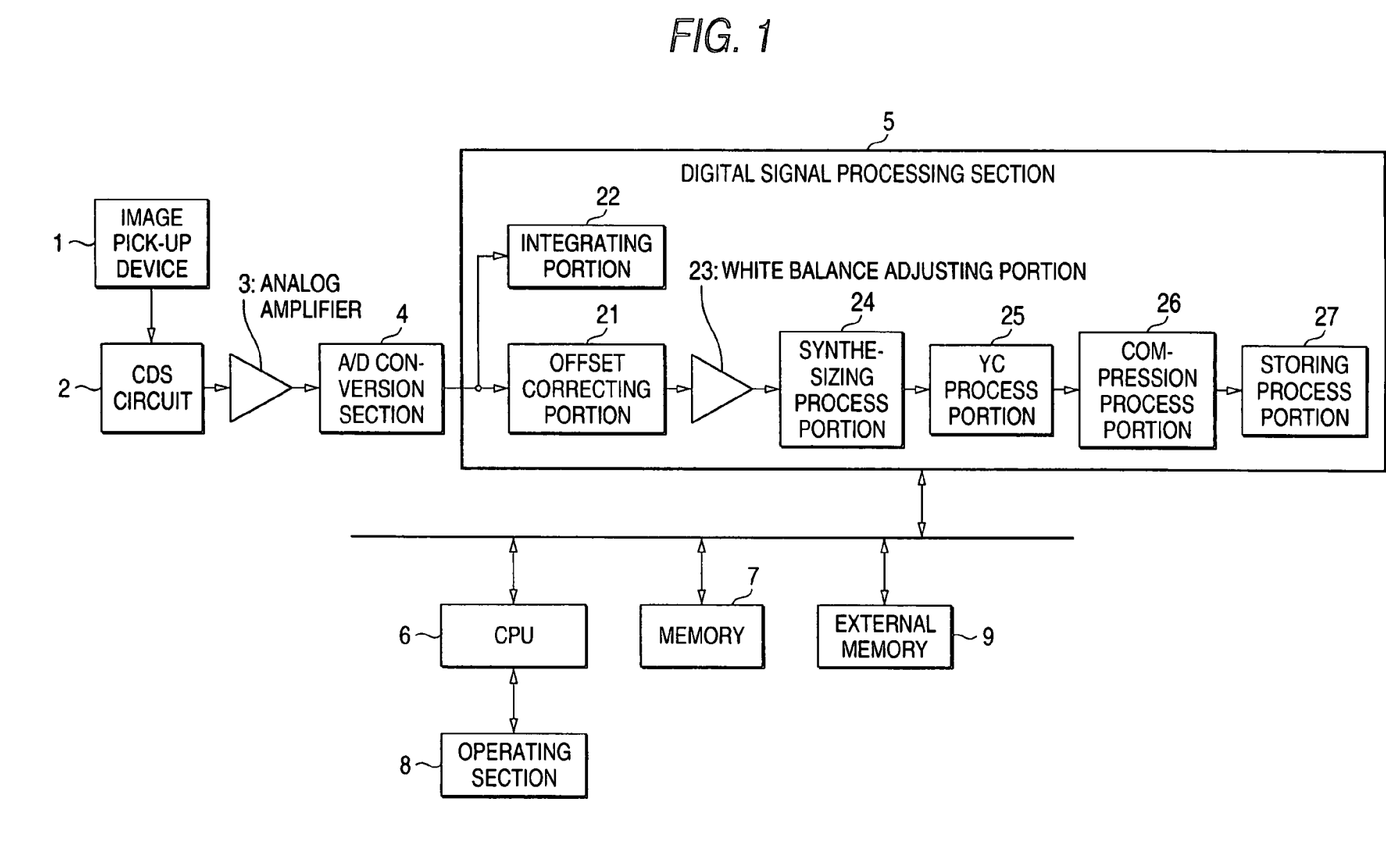
FIG. 1 is a block diagram showing a configuration of an image pick-up apparatus according to an embodiment of the invention.

FIG. 1 is a block diagram showing a configuration of an image pick-up apparatus according to first embodiment of the invention. In the first embodiment, an example of a configuration of a digital still camera will be shown as an example of an image pick-up apparatus. The invention is not limited to digital still cameras and may be applied to other types of image pick-up apparatus such as digital video cameras.

The image pick-up apparatus of the first embodiment has an image pick-up device 1 constituted by a CCD solid-state image pick-up device or the like, a CDS circuit 2 for performing a correlated double sampling process or the like, an analog amplifier 3 for amplifying a signal, an A/D converter 4 for performing conversion into a digital signal, a digital signal processing section 5 for performing various processes for a digital image signal, a central processing unit (CPU) 6 for performing control of the operation of each part, calculation processes, and the like, a memory 7 for storing various set values and temporarily storing image data and the like, an operating section 8 including buttons or the like for inputting operations of the image pick-up apparatus, and an external memory 9 or the like for storing image data.

The digital signal processing section 5 has an offset correcting portion 21 for performing an offset correcting process on an input image signal, an integrating portion 22 for performing an integrating process for each of R, G, and B color signals in the input image signal, a white balance adjusting portion (WB adjusting portion) 23 for performing white balance adjustment of the image signals, a synthesizing process portion 24 for synthesizing image signals acquired by a plurality of pixels that are different in sensitivity, a YC process portion 25 for generating a luminance signal Y and chrominance signals Cr and Cb from the R, G, and B color signals, a compression process portion 26 for compressing an image signal based on a predetermined compression-coding method such as JPEG, a storing process portion 27 for storing compressed image data in the external memory 9, and the like.

Figure 2:
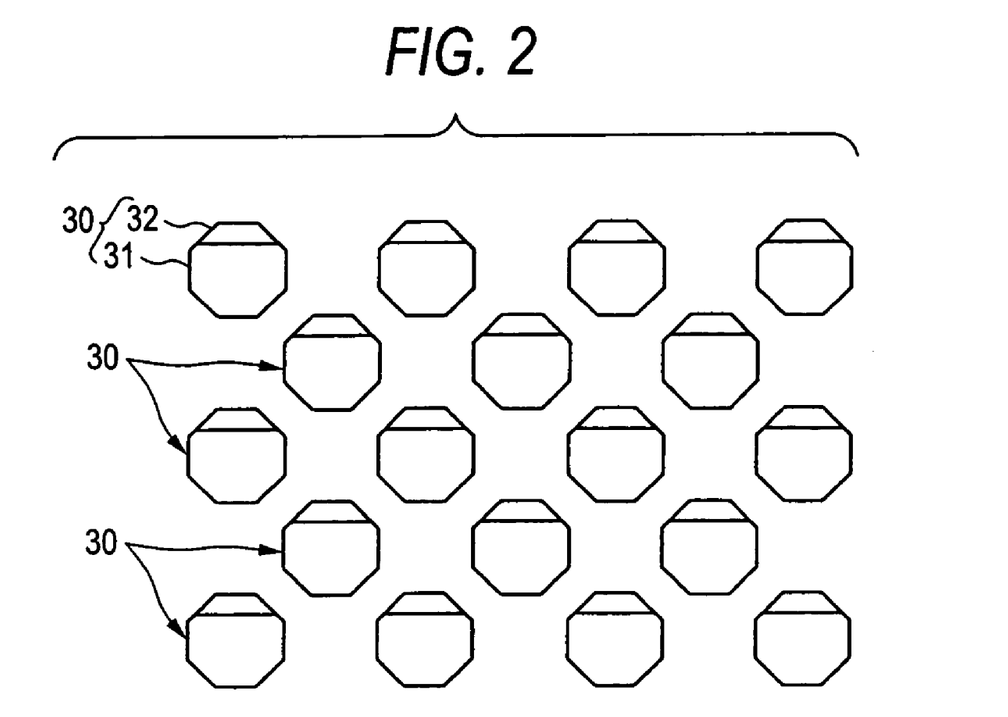
FIG. 2 is a schematic view of an arrangement and a configuration of pixels of an image pick-up device used in the embodiment.

FIG. 2 is a schematic view showing an arrangement and a configuration of pixels of the image pick-up device 1 used in the present embodiment. The present embodiment employs a CCD solid-state image pick-up device as the image pick-up device 1, which has a so-called honeycomb arrangement in which pixels are offset with respect to one another by half a pitch in the horizontal and vertical directions. For example, pixels 30 of the image pick-up device 1 are in a pixel arrangement as disclosed in JP-A-10-136391 in which they are positioned with horizontal and vertical offsets of half a pitch with respect to the pixels in the adjacent rows and columns. A configuration is thus provided in which a vertical transfer path (not shown) for transferring a signal charge read from each pixel in the vertical direction is meandered so as to avoid each pixel in the vertical direction.

In the illustrated example, each pixel 30 is configured as a pixel divided into a plurality of light-receiving regions in that it has a high sensitivity pixel (hereinafter referred to as "main pixel") 31 having a large area that occupies about ⅘ of the light-receiving area, and a low sensitivity pixel (hereinafter referred to as "sub-pixel") 32 having a small area that occupies about ⅕ of the light-receiving area. Signal charges obtained by photoelectric conversion and outputted respectively from the main pixel 31 and the sub-pixel 32 that are different in sensitivity are read into and transferred by the above-described vertical transfer path that is not shown, the signal charges being discriminated from each other. They are passed through a horizontal transfer path and an output amplifier, which are not shown, and are outputted as image pick-up signals from the image pick-up device 1.

The dynamic range of an image that has been picked up can be expanded by synthesizing outputs from a plurality of such pixels of different sensitivity into one image. For example, the synthesizing process may be performed such that the outputs of the main pixels become dominant when there is a small quantity of light (when luminance is low or the object image is dark) and such that the outputs of the sub-pixels become dominant when there is a large quantity of light (when luminance is high or the object image is light), which makes it possible to provide an image pick-up apparatus having a wide dynamic range that allows a favorable image to be obtained without rendering dark parts of the image in a black monotone and light parts of the image in a white monotone. In the present embodiment, a high sensitivity image (an image obtained by the main pixels 31) and a low sensitivity image (an image obtained by the sub-pixels 32) are simultaneously acquired by one photographic operation, and the image signals are sequentially read and subjected to the synthesizing process.

The pixels 30 of the image pick-up device 1 are divided in ratios and positions that depend on the design, and FIG. 2 merely shows an example. The image pick-up device 1 is not limited to CCD solid-state image pick-up devices having a honeycomb arrangement as shown in FIG. 2, and it may be a CCD solid-state image pick-up device having a tetragonal lattice arrangement (Bayer type). Alternatively, a solid-state image pick-up device utilizing a CMOS sensor having a honeycomb arrangement or tetragonal lattice arrangement may be employed.

Photographic and image processing operations of the image pick-up apparatus having the above-described configuration will now be described. An image of an object formed on the light-receiving surface of the image pick-up device 1 through a photographic lens is converted by the main pixel 31 and the sub-pixel 32 of each pixel 30 into signal charges having levels that depend on the quantity of the incident light. The signal charges accumulated in the pixel 30 are sequentially transferred and read through the vertical transfer paths and the horizontal transfer paths that are not shown and are output as image pick-up signals. The signals output by the image pick-up device 1 are subjected to a correlated double sampling process and a color separation process at the CDS circuit 2 to obtain R, G, and B color signals for an image from each of the main pixel 31 and the sub-pixel 32.

The R, G, and B color signals of each pixel are amplified to predetermined levels by the analog amplification circuit 3 and are converted into digital signals by the A/D converter 4. The digitized R, G, and B signals of each of the main pixel 31 and the sub-pixel 32 are inputted to the digital signal processing section 5 to be subjected to image signal processing.

In the digital signal processing section 5, the offset correcting portion 21 performs an offset correction process for matching the levels of the R, G, and B color signals on the basis of black. Next, the white balance adjusting portion (white balance adjusting means) 23 reads gain values for white balance adjustment of each of the main pixel 31 and sub-pixel 32 from the memory (storage means) 7, the gain values being obtained by a custom white balance setting process by the CPU 6 to be described later, and the portion 23 multiplies each of the color signals from the main pixel 31 and the sub-pixel 32 output from the offset correcting portion 21 by a gain value to adjust color balance between the R, G, and B color components.

Then, the synthesizing process portion 24 synthesizes the R, G, and B color signals, which have been subjected to the color balance adjustment, of the main pixel 31 and the sub-pixel 32, respectively. Thus, the R, G, and B color signals of each pixel 30 of the image pick-up device 1 are obtained with an increased dynamic range by synthesizing the image signal from the main pixel 31 and the image signal from the sub-pixel 32. Further, the YC processing portion 25 performs a predetermined calculation on the R, G, and B signals associated with each pixel 30 to generate an image signal including a luminance signal Y, and chrominance signals Cr and Cb. Then, the image signal is subjected to a compression process at the compression process portion 26 according to a predetermined compression-coding method such as JPEG, and the compressed image data are recorded by the storing process portion 27 in the external memory 9 such as a memory card constituted by a flash memory or the like.

Although not shown, the digital signal processing section 5 also performs known image processing such as gamma correction, noise elimination, contour correction, and tone correction.

The integrating portion 22 calculates an integrated value of each of the R, G, and B color signals in each of the main pixel 31 and the sub-pixel 32 when gain values are calculated as control values for white balance adjustment at a custom white balance setting process to be described later. At this time, the CPU 6 functions as white balance control value calculating means for calculating the gain values for white balance adjustment based on the integrated values calculated by the integrating portion 22. The CPU 6 governs and controls each part of the image pick-up apparatus based on inputs from the operating section 8 and also functions as control means for performing automatic focusing, automatic exposure control and the like that are not described in the present embodiment.

Figure 3:
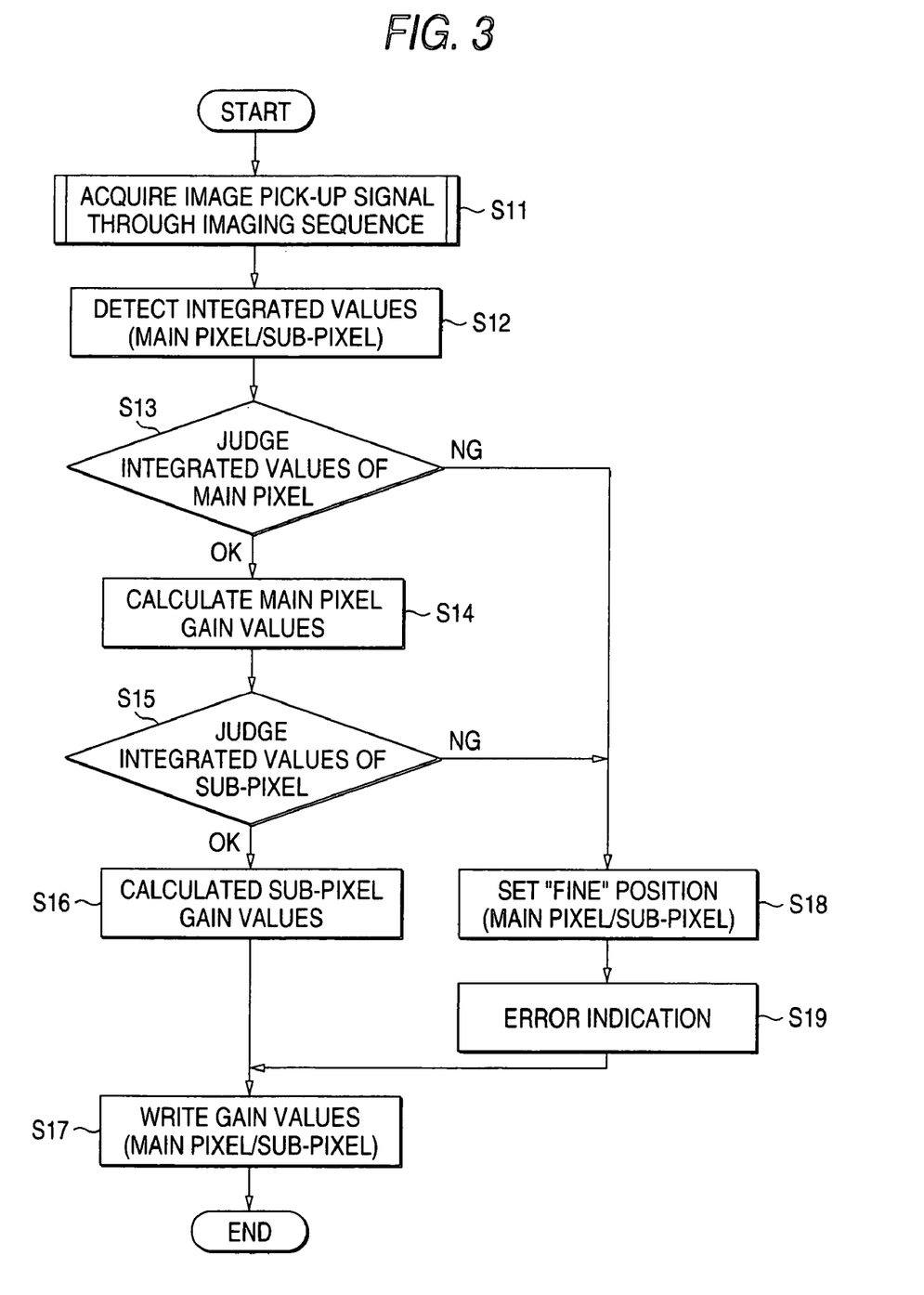
FIG. 3 is a flow chart showing a gain setting process included in custom white balance control performed the embodiment of the invention.

Custom white balance control according to the first embodiment will now be described in detail. FIG. 3 is a flow chart showing a gain setting process included in custom white balance control performed in the first embodiment of the invention.

When custom white balance control is performed, a certain operation on the image pick-up apparatus, e.g., pressing a push-button of the operating section 8 is performed to start custom white balance setting, and gain values for white balance adjustment are calculated based on the levels of color signals of image data which have been acquired in advance by photographing an object to serve as a reference of white.

First, the operating section 8 is operated to instruct the start of custom white balance setting, and an object is photographed by performing a photographing sequence to acquire image pick-up signals (step S11). At this time, an image signal obtained by each of the main pixel 31 and the sub-pixel 32 of a pixel 30 of the image pick-up device 1 is subjected to correlated double sampling and a color separation process at the CDS circuit 2, and R, G, and B color signals are generated for the image from each of the main pixel 31 and the sub-pixel 32. The R, G, and B signals from the main pixel 31 and the sub-pixel 32 are amplified by the analog amplification circuit 3 and converted by the A/D converter 4 into digital signals which are then input to the integrating portion 22 of the digital signal processing section 5.

Next, the integrating portion 22 calculates integrated values of the R, G, and B color components for each of the main pixel 31 and the sub-pixel 32 (step S12). At this time, integrated values of R, G, and B color components per pixel are calculated in association with each of the main pixel 31 and the sub-pixel 32 in, for example, 2·2=4 areas that are located in the middle of a plurality of areas (8·8=64 areas) formed by dividing the photographed image as a whole. Integrated values Rint1, Gint1, and Bint1 associated with the main pixel 31 and integrated values Rint2, Gint2, and Bint2 associated with the sub-pixel 32 thus calculated are sent to and processed by the CPU 6.

The CPU 6 first compares the integrated values Rint1, Gint1, and Bint1 of the main pixel 31 with an upper limit value and a lower limit value that are determined in advance to determine whether the integrated values are within a specified range of signal levels (step S13). Since white balance adjustment can be adversely affected when the integrated values of the color components are not at the specified signal levels, it is determined whether the values exceed the upper limit value or lower limit value and, if yes, setting of custom white balance is stopped.

When the integrated values are within the predetermined range of levels at step S13 (when they are acceptable), gain values (first control values) for white balance adjustment of the main pixel 31 are calculated (step S14). At this time, a gain value Rgain1 for white balance adjustment for the R signal and a gain value Bgain1 for white balance adjustment for the B signal are calculated according to Equations (1) and (2) shown below on the basis of a gain value Ggain1 for white balance adjustment for the G signal associated with the main pixel 31. The gain value Ggain1 for white balance adjustment for the G signal to serve as a reference is appropriately obtained from the integrated value Gint1. For example, Ggain1=1.0.

$$Rgain1 = Ggain1 \cdot Gint1/Rint1 \quad (1)$$

$$Bgain1 = Ggain1 \cdot Gint1/Bint1 \quad (2)$$

Then, integrated values Rint2, Gint2, and Bint2 of the sub-pixel 32 are compared with an upper limit value and a lower limit value that are determined in advance, as done for the main pixel 31, to determine whether the integrated values are within a specified range of signal levels (step S15). When the integrated values are within the predetermined range of levels (when they are acceptable), gain values (second control values) for white balance adjustment of the sub-pixel 32 are calculated (step S16). At this time, a gain value Rgain2 for white balance adjustment for the R signal and a gain value Bgain2 for white balance adjustment for the B signal are calculated according to Equations (3) and (4) shown below on the basis of a gain value Ggain2 for white balance adjustment for the G signal associated with the sub-pixel 32. The gain value Ggain2 for white balance adjustment for the G signal to serve as a reference is appropriately obtained from the integrated value Gint2. For example, Ggain2=1.0.

$$Rgain2 = Ggain2 \cdot Gint2/Rint2 \quad (3)$$

$$Bgain2 = Ggain2 \cdot Gint2/Bint2 \quad (4)$$

The gain values Rgain1 and Rgain2 for the R signal white balance adjustment, the gain values Ggain1 and Ggain2 for the G signal white balance adjustment, and the gain values Bgain1 and Bgain2 for the B signal white balance adjustment respectively associated with the main pixel 31 and the sub-pixel 32 thus calculated are written and held in the memory 7 as white balance adjusting values (gain values for R, G, and B colors) for custom white balance control (step S17).

When the integrated values are out of the predetermined range of levels (when they are unacceptable, that is, NG) at step S13 or S15, white balance is set at "fine position" (step S18) and an error indication is given (step S19). Referring to the error indication, indications such as "over" in the case of integrated values greater than the upper limit value (the image is light) and "under" in the case of integrated values smaller than the lower limit value (the image is dark) are displayed in a display section of a liquid crystal display or the like which is not shown.

When a picture is taken under custom white balance control using the gain values thus set, image signals acquired by a photographing sequence of the image pick-up device 1 are subjected to white balance adjustment that is performed on each of the main pixels 31 and the sub-pixels 32 at the white balance adjusting portion 23 of the digital signal processing section 5 using the gain values for a custom white balance adjustment held in the memory 7.

In the case of an image pick-up apparatus having an image pick-up device having main pixels and sub-pixels, since those pixels have different output levels even in picking up an image under the same photographic conditions, the main pixels and the sub-pixels may have different spectral sensitivity characteristics. For example, when gain values for custom white balancing are calculated and set for only the main pixels, the color balance of image signals from the sub-pixels is not accurately reproduced during white balance adjustment because the main pixels and sub-pixels have different output level ratios between R, G, and B signals when they have different spectral sensitivity characteristics, which results in a color imbalance. In particular, a color imbalance occurs on a high-luminance side of an image where signals output from the sub-pixels are dominant.

On the contrary, in the present embodiment, when gain values for white balance adjustment are obtained by photographing an object to perform custom white balance control, the gain values are separately calculated in association with the main pixels 31 and the sub-pixels 32 of the image pick-up device 1 and are stored in the memory. To acquire image data through photographing, white balance adjustment is separately performed for the main pixels 31 and the sub-pixels 32 using proper gain values set for each of the main pixels 31 and the sub-pixels 32, and image signals from the main pixels 31 and the sub-pixels 32 are thereafter synthesized to acquire image data.

Thus, in an image pick-up apparatus utilizing an image pick-up device having a wide dynamic range achieved by providing two types of pixels that are different in sensitivity, white balance control can be optimized to improve color reproducibility. Therefore, the present embodiment makes it possible to obtain a picked-up image having a wide dynamic range and excellent color reproducibility.

Second Embodiment

In second embodiment, white balance positions such as "fine", "cloudy", "shaded", "electric bulb", and "fluorescent light" positions are set according to types of scenes to be photographed and light sources, for example. Further, gain values for white balance adjustment are previously stored in the memory 7 for each of the main pixel 31 and the sub-pixel 32, which are explained in the first embodiment, in association with each of the white balance positions.

The CPU 6 of the embodiment functions as white balance control value calculating means for calculating the gain values for white balance adjustment based on the integrated values calculated by the integrating portion 22. Whereas, a CPU 16 of the second embodiment determines the scene being photographed and the light source at the time of photographing based on the integrated values calculated by the integrating portion 22.

The configuration of an image pick-up apparatus according to the second embodiment is same with the image pick-up apparatus according to the first embodiment shown in FIG. 1, except the functions of the CPU 6 and the CPU 16.

Figure 4:
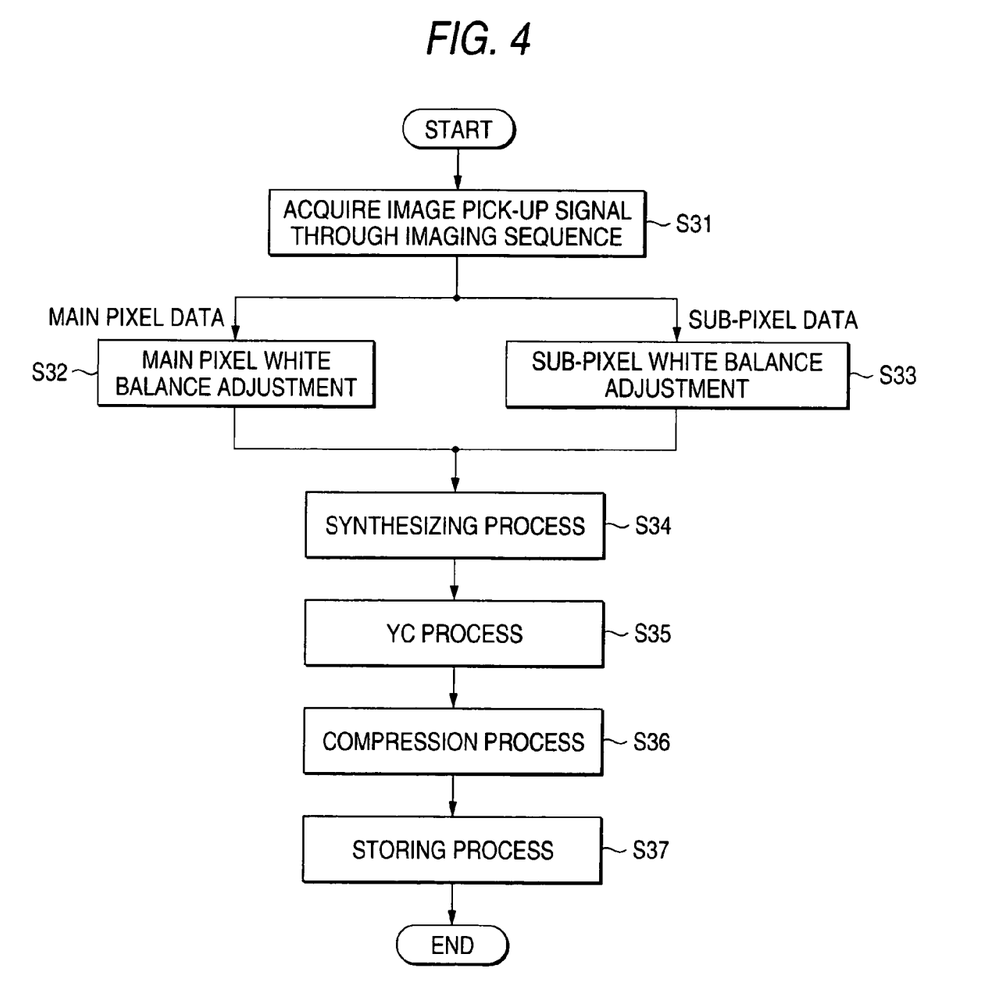
FIG. 4 is a flow chart showing processes of manual white balance control in a first embodiment of the invention.

White balance control according to the second embodiment will now be described in detail. FIG. 4 is a flow chart showing processes included in manual white balance control performed in the second embodiment of the invention.

First, an object to be imaged is picked up by performing a photographing sequence based on operations on the operating section 8 to acquire image pick-up signals (step S31). At this time, an image signal obtained by each of the main pixel 31 and the sub-pixel 32 of a pixel 30 of the image pick-up device 1 is subjected to correlated double sampling and a color separation process at the CDS circuit 2 to generate R, G, and B color signals for the image from each of the main pixel 31 and the sub-pixel 32. The R, G, and B color signals from the main pixel 31 and the sub-pixel 32 are amplified by the analog amplification circuit 3, converted by the A/D converter 4 into digital signals which are in turn input to the digital signal processing section 5.

In the digital signal processing section 5, offsets of the R, G, and B color signals are processed at the offset correcting portion 21, and white balance adjustment is performed according to a selected white balance position at the white balance adjusting portion 23. In the second embodiment, white balance adjustment (step S32) of the image signal from the main pixel 31 and white balance adjustment (step S33) of the image signal from the sub-pixel 32 are performed separately according to the white balance position.

In the present embodiment, white balance positions such as "fine", "cloudy", "shaded", "electric bulb", and "fluorescent light" positions are set according to types of scenes to be imaged and light sources as shown in Table 1, for example, and gain values for white balance adjustment are set for each of the main pixel 31 and the sub-pixel 32 in association with each of the white balance positions. In the example shown in FIG. 1, gains Rgain1, Ggain1, Bgain1 (first control values) and gains Rgain2, Ggain2, and Bgain2 (second control values) are set for the main pixel and the sub-pixel, respectively, and the gains are stored in the memory 7 as a white balance control table. For example, those gain values are adjusted and set for each image pick-up apparatus through measurement using a reference light source at the time of manufacture.

| White Balance Position | Main Pixel Gain | | | Sub-pixel Gain | | |
|---|---|---|---|---|---|---|
| | Ggain1 | Rgain1 | Bgain1 | Ggain2 | Rgain2 | Bgain2 |
| Fine | ×1.0 | ×2.0 | ×3.0 | ×1.0 | ×2.4 | ×2.4 |
| Cloudy | ×1.0 | ×3.0 | ×2.0 | ×1.0 | ×3.6 | ×1.6 |
| Shady | ×1.0 | ×4.0 | ×1.0 | ×1.0 | ×4.8 | ×0.8 |
| Electric Bulb | ×1.0 | ×1.0 | ×4.0 | ×1.0 | ×1.2 | ×3.2 |
| White Fluorescent Lamp | ×1.0 | ×3.0 | ×3.0 | ×1.0 | ×3.6 | ×2.4 |
| Natural White Fluorescent Lamp | ×1.0 | ×2.0 | ×2.0 | ×1.0 | ×2.4 | ×1.6 |
| Daylight Fluorescent Lamp | ×1.0 | ×3.0 | ×1.0 | ×1.0 | ×3.6 | ×0.8 |

The white balance adjusting portion 23 performs white balance adjustment by reading a gain value for white balance adjustment for each of R, G, and B color signals associated with the selected white balance position from the memory 7. At this time, Equations (1) to (6) shown below are calculated to obtain color signals Radj1, Gadj1, Badj1, Radj2, Gadj2, and Badj2, which have been subjected to white balance adjustment, for the main pixel 31 and the sub-pixel 32.

$$Radj1 = R1 \cdot Rgain1 \quad (1)$$

$$Gadj1 = G1 \cdot Ggain1 \quad (2)$$

$$Badj1 = B1 \cdot Bgain1 \quad (3)$$

$$Radj2 = R2 \cdot Rgain2 \quad (4)$$

$$Gadj2 = G2 \cdot Ggain2 \quad (5)$$

$$Badj2 = B2 \cdot Bgain2 \quad (6)$$

where R1, G1, B1, R2, G2, and B2 represent color signals, which have not been subjected to white balance adjustment yet, obtained from the main pixel 31 and the sub-pixel 32.

When manual white balance control is performed, the photographer selects a white balance position by setting the operating section 8 through a manual operation taking the scene to be photographed, the light source or the like into consideration.

Such white balance adjustment makes it possible to adjust color balance between R, G, and B color components of image signals from each of the main pixels 31 and the sub-pixels 32 properly. When only the main pixels 31 are read to form image data from only image signals from the main pixels 31, the gain values for the main pixels are used for white balance adjustment. When only the sub-pixels 32 are read to form image data from only image signals from the sub-pixels 32, the gain values for the sub-pixels are used for white balance adjustment.

Next, the synthesizing process portion 24 synthesizes the R, G, and B color signals, which have been subjected to a color balance adjustment, for the main pixels 31 and the sub-pixels 32 (step S34), and the YC processing portion 25 then performs a predetermined calculation on each of the R, G, and B color signals associated with each pixel 30 to generate an image signal comprised of a luminance signal Y and chrominance signals Cr and Cb (step S35). Then, the compression process portion 26 performs a compression process on the image signal according to a predetermined compression-coding method such as JPEG (step S36), and the compressed image data are stored in the external memory 9 by the storing process portion 27 (step S37).

In the case of an image pick-up apparatus including an image pick-up device having main pixels and sub-pixels, the main pixels and sub-pixels may have different spectral sensitivity characteristics even in picking up an image under the same photographing conditions because those pixels have different output levels. For example, when a single gain value for white balance adjustment is used to control white balance in such a case, a color imbalance may occur.

When white balance adjustment is performed on an image signal acquired by the sub-pixels using a gain which has been optimized for an image signal acquired by the main pixels, the color balance of the image picked up by the sub-pixels will not be accurately reproduced. Especially, the image is undesirably colored on a high luminance side thereof where the signal output from the sub-pixels is dominant. Conversely, when white balance adjustment is performed on an image signal acquired by the main pixels using a gain which has been optimized for the image signal acquired by the sub-pixels, the image is undesirably colored on a low luminance side thereof where the signal output from the main pixels is dominant. In either case, an image with poor color balance will result.

On the contrary, in the present embodiment, there are gain values that are set so as to be optimal for each of a main pixel 31 and a sub-pixel 32. When white balance control is performed, white balance adjustment is performed separately for each of the main pixel 31 and the sub-pixel 32 using those gain values. Thereafter, image signals from the main pixel 31 and the sub-pixel 32 are synthesized to obtain image data.

Thus, in an image pick-up apparatus utilizing an image pick-up device having a wide dynamic range achieved by providing two types of pixels that are different in sensitivity, white balance control can be optimized to improve color reproducibility. Therefore, the present embodiment makes it possible to obtain a picked-up image having a wide dynamic range and excellent color reproducibility.

Third Embodiment

Figure 5:
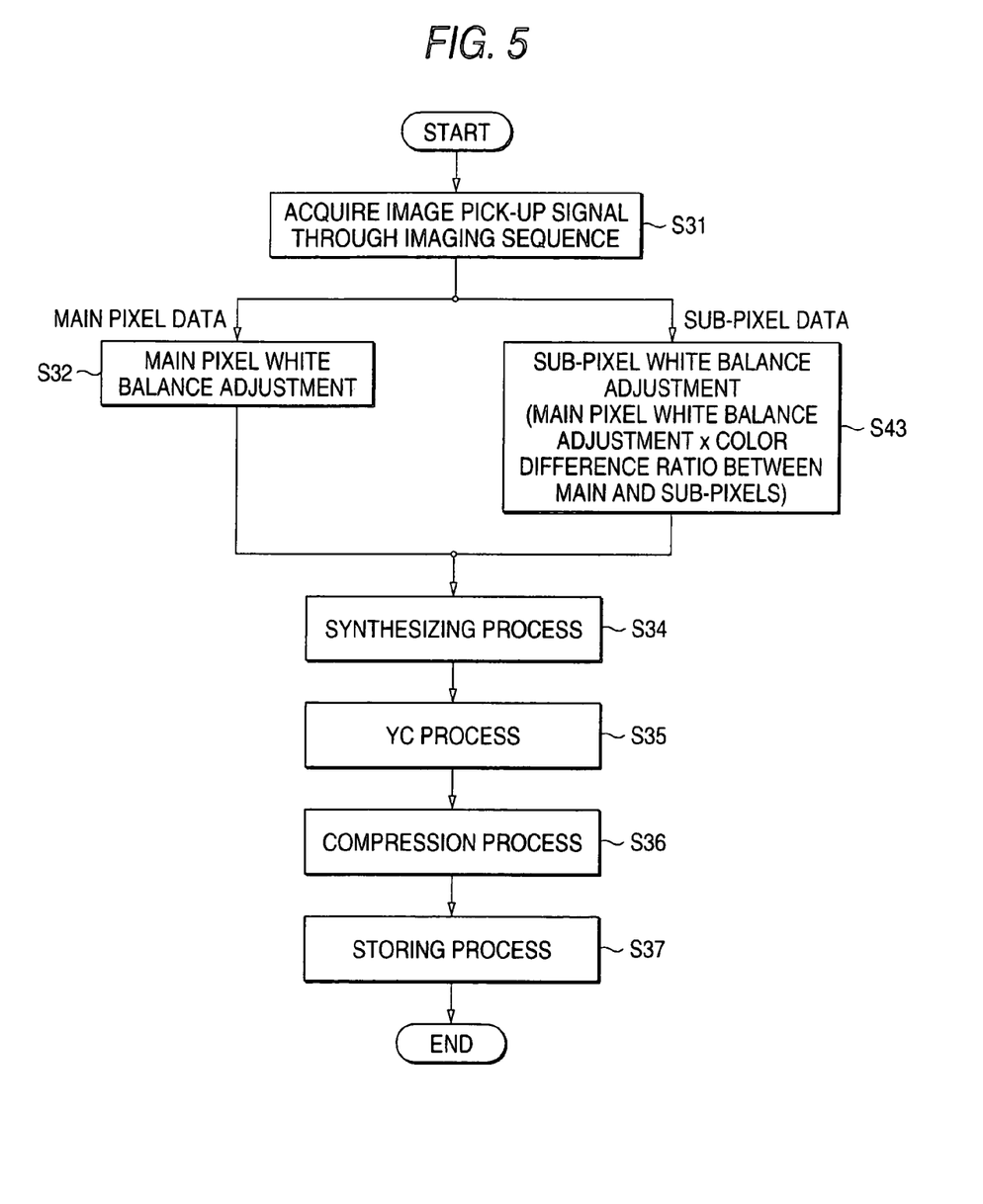
FIG. 5 is a flow chart showing processes of manual white balance control in a second embodiment of the invention.

FIG. 5 is a flow chart showing processes included in manual white balance control performed in a third embodiment of the invention. While a configuration in which gain values required for white balance adjustment are separately provided for main pixels and sub-pixels has been described in the above second embodiment, the third embodiment will show an example in which gain values for white balance adjustment are provided only for main pixels.

In this case, only gains Rgain1, Ggain1, and Bgain1 for main pixels are set for each image pick-up apparatus in association with white balance positions according to types of scenes to be imaged and light sources such as "fine", "cloudy", "shaded", "electric bulb", and "fluorescent lamp" positions as shown in Table 2, for example, and the gain values for white balance adjustment are stored in the memory 7 as a white balance control table. Data of the color difference ratio of the sub-pixels 32 relative to the main pixels 31 are also held. White balance adjustment for the sub-pixels 32 is performed by multiplying the gains for the main pixels by the color difference ratio. Thus, color balance is adjusted by gain values that are equivalent to the gains for the sub-pixels. When a color difference ratio under a certain light source, e.g., a fluorescent lamp is different from that in sunlight, the color difference ratio may be appropriately adjusted for each white balance position.

| White Balance Position | Main Pixel Gain | | |
|---|---|---|---|
| | Ggain1 | Rgain1 | Bgain1 |
| Fine | ×1.0 | ×2.0 | ×3.0 |
| Cloudy | ×1.0 | ×3.0 | ×2.0 |
| Shady | ×1.0 | ×4.0 | ×1.0 |
| Electric Bulb | ×1.0 | ×1.0 | ×4.0 |
| White Fluorescent Lamp | ×1.0 | ×3.0 | ×3.0 |
| Natural White Fluorescent Lamp | ×1.0 | ×2.0 | ×2.0 |
| Daylight Fluorescent Lamp | ×1.0 | ×3.0 | ×1.0 |

(Color difference Ratio Rd: 1.2, Bd: 0.8)

The only difference of the flow chart in FIG. 5 from the second embodiment is step S43 at which white balance adjustment for the sub-pixels 32 is performed. The other steps S31, S32, and S34 to S37 are same with each one of the second embodiment shown in FIG. 4 and will not be described here.

At step S43, the white balance adjusting portion 23 reads gains Rgain1, Ggain1, and Bgain1 for the main pixels associated with a selected white balance position from the memory 7 as gain values for white balance adjustment and performs white balance adjustment for the sub-pixels 32 using the gains for the main pixels and color difference ratios. At this time, Equations (7) to (9) shown below are calculated to obtain white-balance-adjusted color signals Radj2, Gadj2, and Badj2 for the sub-pixels 32.

$$Radj2 = R2 \cdot Rgain1 \cdot Rd \quad (7)$$

$$Gadj2 = G2 \cdot Ggain1 \cdot Gd \quad (8)$$

$$Badj2 = B2 \cdot Bgain1 \cdot Bd \quad (9)$$

where R2, G2, and B2 represent color signals, which have not been subjected to white balance adjustment yet, obtained from the sub-pixels 32, and Rd, Gd, and Bd represent color difference ratios of the sub-pixels 32 relative to the main pixels 31. For example, Gd=1.0; Rd=1.2; and Bd=0.8.

In the third embodiment, there is provided gain values that are set so as to be optimal for the main pixels 31. When white balance control is performed, white balance adjustment is separately performed for the main pixels 31 and the sub-pixels 32 using the gain values and the color difference ratio of the sub-pixels 32 relative to the main pixels 31. As a result, just as in the second embodiment, white balance control can be optimized to improve color reproducibility of an image pick-up apparatus utilizing an image pick-up device that is provided with two pixels to achieve a wider dynamic range.

The invention is not limited to the above-described embodiments in any sense and may be carried out in various modes without departing from the principle of the same. While the above embodiments have been described with reference to manual white balance control, the invention may be similarly used for automatic white balance control in which an apparatus automatically determines the light source at the time of photographing and the scene to be photographed to perform an optimum white balance adjustment. In the case of automatic white balance control, for example, R/G and B/G ratios are obtained from integrated values of R, G, and B color signals read from an image pick-up device, and a white balance position is automatically determined based on the ratios and information on the luminance of the object (a photographic EV value) for automatic exposure control. Then, white balance adjustment may be performed for each of the main pixels and the sub-pixels using gain values for the main pixels and the sub-pixels associated with the white balance position selected based on the automatic determination.

As described above, according to the embodiments, in an image pick-up apparatus utilizing an image pick-up device having a wide dynamic range achieved by providing two types of pixels that are different in sensitivity, white balance control can be properly performed to improve color reproducibility.

What is claimed is:

1. An image pick-up apparatus which includes an image pick-up device having a plurality of main pixels having high sensitivity and a large light receiving area and a plurality of sub-pixels having low sensitivity and a small light receiving area, comprising:
   storage means for storing control values for white balance adjustment which are set in association with each of said plurality of pixels; and
   white balance adjusting means for separately performing white balance adjustment of each of the image signals acquired from the plurality of pixels of said image pick-up device with using said corresponding control values,
   wherein said storage means stores a control value for white balance adjustment associated with said main pixel, and said white balance adjusting means performs white balance adjustment of an image signal from said main pixel with using said control value stored in said storage means and performs white balance adjustment of an image signal from said sub-pixel with using said control value and a color difference ratio of the image signals between said main pixel and said sub-pixel.

2. An image pick-up apparatus which includes an image pick-up device having a plurality of main pixels having high sensitivity and a large light receiving area and a plurality of sub-pixels having low sensitivity and a small light receiving area, comprising:
   white balance control value calculating means for calculating control values for white balance adjustment of each pixels based on image signals from said image pick-up device acquired by imaging an object; and
   white balance adjusting means for separately performing white balance adjustment of each of the image signals acquired from the pixels of said image pick-up device with using said corresponding control values,
   wherein white balance adjustment for at least one sub-pixel is performed based on gains for the main pixels and color difference ratios of the sub-pixels relative to the main pixels.

3. The image pick-up apparatus according to claim 2, further comprising:

storage means for storing said control values for white balance adjustment, wherein said white balance control value calculating means calculates a first control value for white balance adjustment associated with said main pixel and a second control value for white balance adjustment associated with said sub-pixel to store the first control value and the second control value to said storage means.

4. A white balance control method by an image pick-up apparatus which includes an image pick-up device having a plurality of main pixels having high sensitivity and a large light receiving area and a plurality of sub-pixels having low sensitivity and a small light receiving area, comprising the steps of:

calculating control values for white balance adjustment of each of said plurality of pixels based on image signals from said image pick-up device acquired by imaging an object; and separately performing white balance adjustment of each of the image signals acquired from the plurality of pixels of said image pick-up device using said corresponding control values, wherein white balance adjustment for at least one sub-pixel is performed based on gains for the main pixels and color difference ratios of the sub-pixels relative to the main pixels.

5. The white balance control method according to claim 4, further comprising:

calculating a first control value for white balance adjustment associated with said main pixel and a second control value for white balance adjustment associated with said sub-pixel; and storing the first control value and the second control value to a storage means.

6. An image pick-up apparatus which includes an image pick-up device having a plurality of main pixels having high sensitivity and a large light receiving area and a plurality of sub-pixels having low sensitivity and a small light receiving area, comprising:

storage means for storing control values for white balance adjustment which are set in association with each of said plurality of pixels; and white balance adjusting means for separately performing white balance adjustment of each of the image signals acquired from the plurality of pixels of said image pick-up device with using said corresponding control values, wherein white balance adjustment for at least one sub-pixel is performed based on gains for the main pixels and color difference ratios of the sub-pixels relative to the main pixels.

7. An image pick-up apparatus comprising:

an image pick-up device having at least a first plurality of pixels having high sensitivity and a large light receiving area and a second plurality of pixels having low sensitivity and a small light receiving area;

white balance control value calculator which calculates control values for white balance adjustment for each of said plurality of pixels; and white balance adjustor which performs white balance adjustment of each of image signals acquired from the plurality of pixels of said image pick-up device with using said control values obtained for each of said plurality of pixels, wherein white balance adjustment for at least one of said second plurality of pixels is performed based on gains for the first plurality of pixels and color difference ratios of the second plurality of pixels relative to the first plurality of pixels.

8. The image pick-up apparatus according to claim 7, further comprising:

a memory for storing said control values for white balance adjustment, wherein said white balance control value calculator calculates a first control value for white balance adjustment associated with said first plurality of pixel and a second control value for white balance adjustment associated with said second plurality of pixel to store the first control value and the second control value to said memory.

9. An image pick-up apparatus comprising:

an image pick-up device having a first plurality of pixels having high sensitivity and a large light receiving area and a second plurality of pixels having low sensitivity and a small light receiving area:

memory which stores control values for white balance adjustment which are set in association with each of said plurality of pixels; and white balance adjustor which performs white balance adjustment of each of image signals acquired from the plurality of pixels of said image pick-up device with using said control values obtained for each of said plurality of pixels, wherein white balance adjustment for at least one of said second plurality of pixels is performed based on gains for the first plurality of pixels and color difference ratios of the second plurality of pixels relative to the first plurality of pixels.

* * * * *